US006266533B1

(12) United States Patent
Zadeh et al.

(10) Patent No.: US 6,266,533 B1
(45) Date of Patent: Jul. 24, 2001

(54) GPS ASSISTANCE DATA FOR POSITIONING OF MOBILES WITH BUILT-IN GPS

(75) Inventors: Bagher R. Zadeh, Dallas; Shahrokh Amirijoo, Richardson, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/209,351

(22) Filed: Dec. 11, 1998

(51) Int. Cl.[7] ............................. H04Q 7/20; H04B 7/185
(52) U.S. Cl. ................................ 455/456; 342/357.03
(58) Field of Search ................................ 455/456, 457, 455/561, 575, 404; 342/357.03

(56) References Cited

U.S. PATENT DOCUMENTS 6,070,078 * 5/2000 Camp, Jr. et al. ............... 455/456
6,108,558 * 8/2000 Vanderspool, II ............... 455/456

* cited by examiner

Primary Examiner—Nay Maung
Assistant Examiner—Ray Persino
(74) Attorney, Agent, or Firm—Arthur I. Navarro

(57) ABSTRACT

A wireless communication network and methodology providing GPS assistance data for positioning of mobiles with built-in GPS receivers (GPS-MS). The system and methodology includes obtaining a site location of the BTS currently serving a GPS-MS to be located, as well as obtaining the air interface time in relation to the absolute GPS time at the BTS currently serving the GPS-MS. Knowing the geographical location of the BTS currently serving the GPS-MS, range measurement assistance data is provided with a time of calculation to the GPS-MS. This information is used by the GPS-MS to obtain GPS measurement data at the indicated time of calculation using this a priori information. The GPS-MS obtains GPS measurement data based on the a priori information quickly, and returns the GPS assistance data to a mobile location center (MLC) which ultimately determines the position of the GPS-MS. The MLC has ephemris data, and converts the air interface time to the absolute GPS time for calculation of the GPS-MS position. Minimal traffic across the wireless network is required, and the position of the GPS-MS can be quickly obtained.

19 Claims, 3 Drawing Sheets

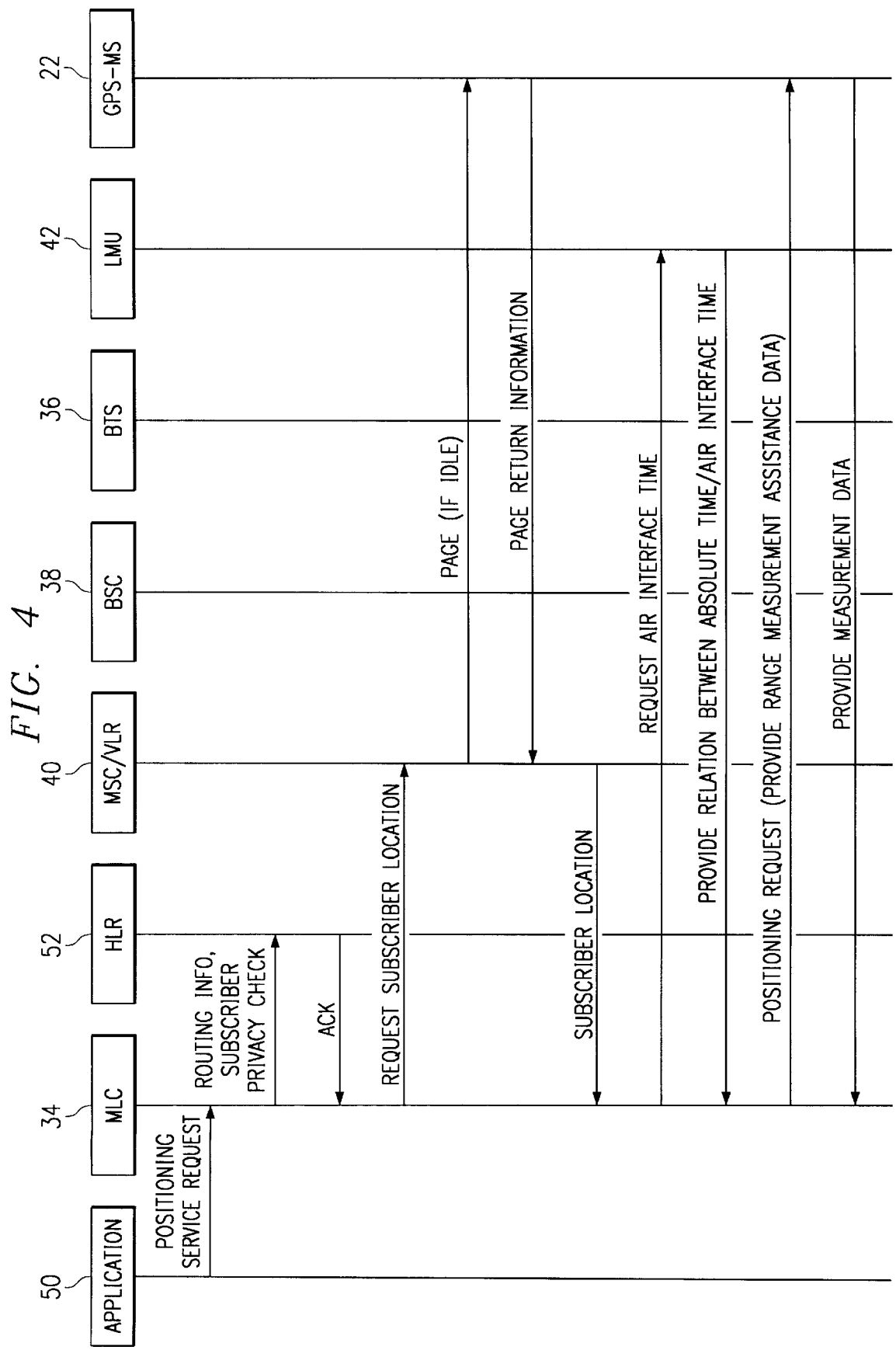

GPS ASSISTANCE DATA FOR POSITIONING OF MOBILES WITH BUILT-IN GPS

FIELD OF THE INVENTION

The present invention is generally related to wireless communication systems including cellular-type wireless networks, and more particularly to the positioning of mobile communication stations with built-in GPS receivers.

BACKGROUND OF THE INVENTION

Wireless communication networks continue to evolve with enhanced and new features being developed for deployment in the current and future generation networks. One particular area of development resides in the area of positioning a mobile station within a wireless network quickly, with high accuracy, and with nominal network traffic. This positioning feature is being required in future networks to provide emergency E911 calls, with specifications requiring positioning to an accuracy of under 10 meters. Positioning of mobiles is also finding advantages in the area of providing position on demand in commercial applications, such as in fleet management for rental car fleets, and the mobile user being able to obtain position on demand to aid in navigation and so forth.

Positioning of a mobile station is particularly difficult due to a number of factors. Terrestrial positioning is encumbered due to multipath and fading of signals, thereby making simple triangulation measurements unreliable for high accuracy calculations. Time of arrival (TOA) techniques measure the received time of synchronized signals broadcast from various points, such as base transceiver stations (BTSs), with the TOA information being provided back to a network node, such as a mobile switching center (MSC) to roughly determine the position of a mobile. Again, due to multipath and signal fading, TOA techniques can only generally provide the position of a mobile station, and will not necessarily meet the high resolution requirements of future applications, such as enhanced emergency E911 calls and navigation systems.

Global positioning system (GPS) receivers are one viable solution to providing a position of a mobile station with high accuracy. The GPS is one solution to meet the positioning requirement in a global system for mobiles (GSM) based network. The GPS meets the requirements of both the FCC-mandated E911 service, as well as other market-driven applications. GPS is based on a constellation of satellites launched by the US Government beginning in 1978. It is a well known technology that has been used in many military and civilian applications.

Most commercially available, standalone GPS receivers operate in a continuous navigation mode. In this mode, the receiver performs psuedorange measurements on a periodic (e.g., one second) and inputs these measurements to a processing algorithm such as a Kalman filter. The Kalman filter takes into account both the statistics of the measurements and the current state of the receiver dynamics to compute a new state estimate with minimum error variance. This approach is advantageous for navigation applications because of the availability of the continuously updated receiver state estimate (e.g., position/velocity/acceleration). Another advantage is that the Kalman filter can propagate the current state when unacceptable or insufficient measurements are available. This is especially helpful for a GPS receiver in an environment with intermittent obstructions to the signal.

However, continuous GPS navigation using an algorithm such as a Kalman filter requires that the receiver be operating continuously or for at least some duty cycle of the update period. The power consumption for this continuous mode may not be acceptable for battery-powered applications such as a GPS in a mobile communication handset. For these applications, there is desired another receiver mode known as position-on-demand. In this mode, the mobile communication handset may request and receive any necessary GPS assistance information from a remote source, acquire the satellite signals and perform pseudorange measurements, and then compute the position estimate, and return it to the remote requestor. Subsequently, the handset puts the GPS receiver into a "sleep" mode until another positioning action is necessary. For a GPS receiver integrated into a mobile communication handset, this position-on-demand mode has a much smaller impact on talk and standby times than the continuous navigation mode.

In a position-on-demand mode, the handset needs GPS assistance information to speed up the search procedure of the GPS receiver due to the motion of satellites relative to the GPS receiver, and vice versa. The duration of the GPS positioning process is directly dependent on how much information the GPS receiver has. Most GPS receivers are programmed with almanac data, which coarsely describes the satellite positions and it is applicable for one year. If the receiver has a real time clock that is reasonably accurate, then it can compute the approximate positions of the satellites at any given time.

However, this information is not sufficient for a position solution. If the GPS receiver does not have some "a priori" knowledge of its approximate location, then it does not know which satellites are visible and their approximate ranges. In this case, the receiver must search the entire length of the Gold code for each satellite. This search procedure is even more difficult due to the motion of the satellites relative to the receiver. The apparent Doppler frequency depends on how much of the motion is along the line of the sight from receiver to satellite, and is in the range of +/−4 kHz in most areas. The search for each satellite must be across all possible code phases and Doppler frequencies, as shown at 10 in FIG. 1. In some modern GPS receivers, the time-to-fix is up to ten minutes.

The time-to-fix can be reduced substantially if the GPS receiver has up-to-date ephemeris and clock correction information. Ephemeris provides a highly accurate model of the satellite motion over a period of two hours, but is much less accurate thereafter. In addition, the time-to-fix can be substantially reduced if the receiver can use the last computed position as an estimate for its current position. The validity of this assumption depends on the user mobility and the time since the last position fix, but in general provides a reasonable starting point for most nonairborne applications. In addition, the accuracy of the receiver's time reference must not have degraded more than a few seconds since the last position fix. Thus, the receiver needs an accurate frequency source.

If all of these conditions are met, then the GPS receiver can compute accurate estimates of the visible satellites and the respective propagation delays (code phases) and Doppler frequencies. This information focuses the correlation search as shown at 12 in FIG. 1, and allows the GPS receiver to compute a position very quickly. A time-to-fix of only a few seconds is feasible for most modern GPS receivers.

Unfortunately, these conditions cannot be met for standalone GPS receivers in all situations. However, a GPS receiver integrated into a mobile station (GPS-MS) can benefit greatly from a network communication link, such as a personal communication service (PCS) communication link. Time and position estimates, as well as satellite ephemeris and clock information, must be provided in a timely manner by the communication network. The frequency accuracy of GSM networks is very good, and can help the GPS-MS to focus the search along the Doppler axis of FIG. 1.

There are several requirements on the wireless network in order to support assisted-GPS positioning. Several methods of providing assisted-GPS positioning are being considered, with the requirement that the methodology not be particularly onerous and generate a large amount of network traffic.

There is desired an assisted-GPS positioning communication system and methodology that provides positioning of mobile stations with a GPS receiver (GPS-MS) that requires nominal network traffic, and that provides a fast and accurate positioning service.

SUMMARY OF THE INVENTION

The present invention achieves advantages as a communication system and method of positioning a GPS enhanced mobile station (GPS-MS) in a wireless communication network by obtaining the geographical location of the serving cell currently serving the mobile station to be positioned, and the air interface time at the serving cell. The wireless network provides range measurement assistance data to the GPS-MS as a function of the cell location that the GPS-MS is located in, and as a function of the air interface time at the serving cell. This range measurement assistance data is utilized by the GPS-MS to obtain GPS measurement data from GPS satellites as a function of the received range measurement assistance data in a timely manner, and with nominal network traffic. The range measurement assistance data is provided along with a time of calculation of the data in a positioning request message to the GPS-MS. The GPS-MS obtains the GPS measurement data from the GPS satellites as a function of the received measurement assistance data at the indicated time of calculation, and provides this GPS measurement data back to a remote location in the wireless network. This remote location ultimately calculates the position of the GPS-MS as a function of the returned GPS measurement data based on the air interface timing. The remote location uses the ephemeris and clock correction data and the returned GPS measurement data expressed in air interface timing, and knowing the relation of the absolute time and air interface timing parameters determines the position of the GPS-MS.

The method of the present invention comprises positioning a GPS-MS served by a serving node in a wireless communications network and by GPS satellites. The method comprises the step of first identifying and determining a geographical location of the cell that the GPS-MS currently resides. Thereafter, the relationship between the air interface time at the identified location cell and the absolute GPS time is identified. Preferably, this timing relationship information is provided by a location measurement unit (LMU) having knowledge of the air interface time at the location cell, and further having a GPS receiver determining the absolute GPS time. Thereafter, knowing the geographical location of the cell serving the GPS-MS to be positioned, and the air interface time provided by the LMU, range measurement assistance data along with a time of calculation expressed in air interface time is provided to the GPS-MS as a function of the determined cell location. The GPS-MS then obtains GPS measurement data from the GPS satellites as a function of the received range measurement assistance data, at the provided time of calculation, the GPS measurement data being based on air interface timing. Finally, position of the GPS-MS is calculated using ephemeris data and the GPS measurement data after converting the air interface time to the absolute GPS time.

The GPS-MS position is calculated at a mobile location node remotely located from the serving node. Preferably, the serving node comprises a base transceiver station (BTS), and the mobile location node comprises a mobile location center (MLC) associated with a mobile switching center (MSC). The LMU associated with the BTS serving the GPS-MS to be positioned reports the absolute time i.e., GPS time, and the air interface timing over the air interface to the MLC, such as using a DTAP message. The MLC provides the time of computing assistance data, expressed as air interface timing, to the GPS-MS so that the GPS-MS obtains the measurements at the appropriate time.

According to another method of the present invention, the method comprises positioning a GPS-MS served by a BTS in a wireless communication network having a mobile switching center (MSC), a mobile location center (MLC) associated with the MSC, and a location measurement unit (LMU) associated with the BTS, the wireless communication network being operable with the network of GPS satellites. The method comprises the step of the MLC identifying the BTS currently serving the GPS-MS, and obtaining the air interface time of the BTS serving the GPS-MS. Knowing the geographical location of the BTS currently serving the GPS-MS, the MLC provides range measurement assistance data to the GPS-MS expressed as a function of the obtained air interface time at the serving BTS, along with a time of calculation of the data. Next, the GPS-MS obtains GPS measurement data at the provided time of calculation as a function of the range measurement assistance data, and provides this GPS measurement data to the MLC. The MLC then calculates the GPS-MS position as a function of the received GPS measurement data, after converting the obtained air interface time to absolute time, and using the ephemeris data. The LMU associated with the BTS serving the GPS-MS provides the air interface time at the serving BTS, and preferably has a GPS receiver obtaining the absolute time. The LMU provides the relationship between the air interface time at the BTS and the absolute time.

The wireless communication network according to the present invention is adapted to communicate with a GPS-MS, the wireless network being operable with satellites of a GPS system. The network comprises a serving node adapted to serve the GPS-MS, the serving node having an air interface time. The network further comprises a mobile location node remotely located from the serving node. The mobile location node has a mechanism to determine an absolute time, and a mechanism to obtain the air interface time at the serving node. The mobile location node further has a mechanism to provide range measurement assistance data to the GPS-MS as a function of the obtained air interface time along with a time of calculation of the assistance data, and as a function of the identified geographical location of the serving node. The mobile location node has a mechanism to calculate a position of the GPS-MS as a function of GPS measurement data obtained from the GPS-MS based on the provided range measurement assistance data, with the GPS measurement data expressed as air interface time. The GPS-MS position is calculated using ephemeris and clock correction data, and the GPS measurement data expressed in air interface time, knowing the relationship of air interface time to the absolute time.

BRIEF DESCRIPTION OF THE DRAWINGS

FIG. 4 is a message flow diagram illustrating the method of the present invention providing range measurement assistance data to the GPS-MS as a function of the air interface time along with a time of calculation, and as a function of the location of the cell currently serving the GPS-MS.

DETAILED DESCRIPTION OF THE PREFERRED EMBODIMENT

Figure 2:
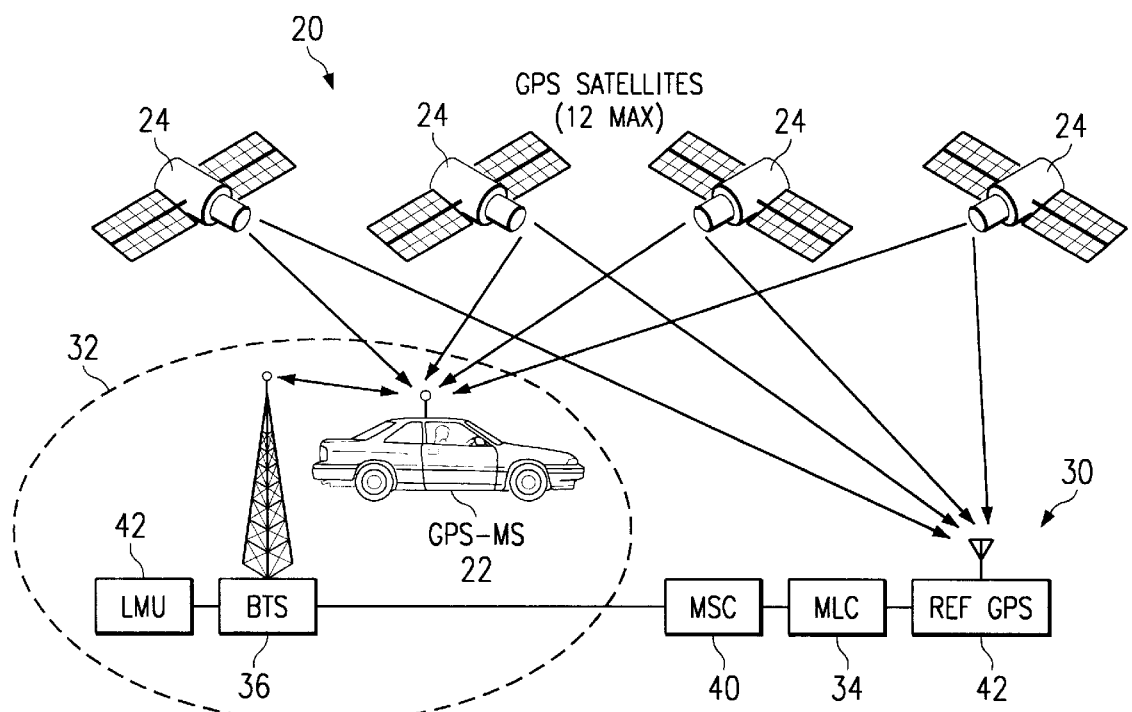
FIG. 2 is a block diagram illustrating a communication system and method of the present invention whereby range measurement assistance data is sent to the GPS-MS upon identifying the location of the particular cell serving the GPS-MS expressed in air interface time.

Referring now to FIG. 2 there is generally shown at 20 a wireless communication network and method positioning a mobile station 22 having a GPS receiver, hereafter referred to as GPS-MS 22. The positioning of the GPS-MS 22 is accomplished by providing GPS assistance data via a cellular-type wireless communication network 30 generally depicted in FIG. 2, and shown in more detail in FIG. 3. There is shown in FIG. 2 a plurality of GPS satellites 24 each transmitting respective GPS signals to the wireless communication network 30, as well as to the GPS-MS 22. According to the present invention, the wireless communication network 30 identifies the cell 32 that the GPS-MS currently resides, and also ascertains the air interface time of the cell 32. Knowing the latitude and longitude coordinates of the identified cell 32 and the air interface time for the cell 32 currently serving the GPS-MS 22, the wireless communication network 30 provides range measurement assistance data along with the time of computing assistance data to the GPS-MS 22 in order for the GPS-MS 22 to quickly make range measurements on the GPS satellites 24. The range measurement assistance data is expressed as the air interface timing since the GPS-MS 22 does not have any knowledge of the relation between absolute time and its particular air interface timing. The GPS-MS 22 returns the GPS measurement data to the wireless communication network 30 expressed as air interface timing. The wireless communication network 30 ultimately determines the position of the GPS-MS 22 by translating the air interface time to absolute time, and calculates the position of the GPS-MS 22 using the GPS measurement data, the absolute time of measurements, ephemeris data, and the site coordinates/cell ID.

The present invention derives technical advantages by providing range measurement assistance data expressed in air interface time to the GPS-MS 22 along with a positioning request. This approach allows the GPS-MS 22 to quickly ascertain GPS measurement data using a priori information, and requires little network traffic since the assistance data is provided with, and only during, the positioning request being sent to the GPS-MS 22 in a point-to-point message. The result is that a shorter overall time, typically only seconds, is needed for the positioning process with a minimal amount of assistance data. The GPS-MS 22 obtains the measurement data as a function of air interface timing thereat. The wireless communication network 30, such as the mobile location center (MLC) 34, converts the interface timing to absolute timing, and thereafter processes the GPS measurement data along with epheremis data to determine the position of the GPS-MS 22.

Figure 3:
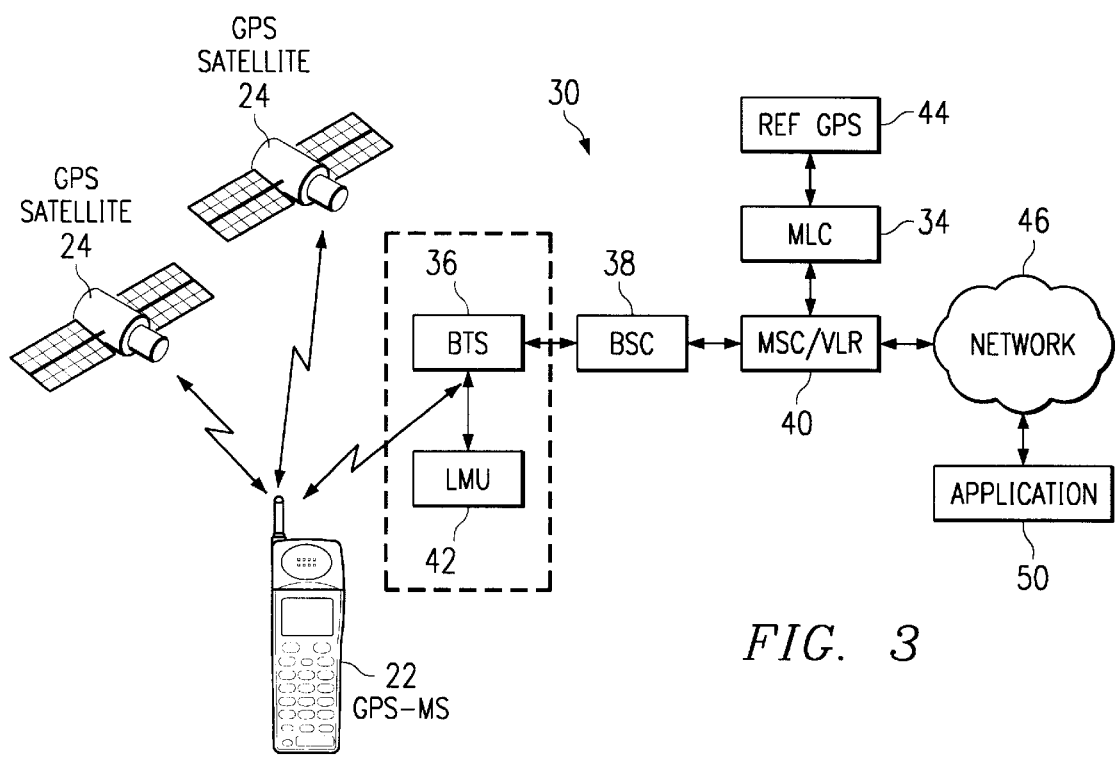
FIG. 3 is a block diagram of the network of the present invention according to the methodology of the present invention.

Referring now to FIG. 3, there is illustrated a detailed block diagram of the wireless communication network 30 according to the present invention suited to perform methodology of the present invention to obtain the positioning of GPS-MS 22. Network 30 is seen to serve the GPS-MS 22 via a base transceiver station (BTS) 36, a base switching center (BSC) 38, and a mobile switching center (MSC)/visitor location register (VLR) 40. A location measurement unit (LNU) 42 is co-located with the BTS 36, and has a GPS receiver providing absolute GPS time to the BTS 36. The BTS 36 has knowledge of the air interface time thereat. According to the present invention, the LMU 42 relates the air interface time of the associated BTS 36 to the absolute GPS time. The LMU 42 measures the synchronization burst of its associated BTS 36 continuously and clocks the air interface timing parameters, i.e. Frame Number (FN), Timeslot Number (TN), and Bit Number (BN) using its GPS receiver. The absolute GPS time, and the air interface time at the BTS 36 serving GPS-MS 22 and thus the relation of each to the other, is provided back to the MLC 34 over the air interface, such as using the DTAP message, upon request to facilitate determining the location of the GPS-MS 22 according to a method that will be described shortly in regard to FIG. 4.

MLC 34 also has a reference GPS receiver 44 associated therewith providing absolute GPS time thereat. Wireless communication network 30 is seen to be interfaced with a transit network generally shown at 46, which may comprise of a public switched telephone network (PSTN), an IP network, or other suitable transit network to facilitate communications between the network 30 and an application generally shown at 50. For purposes of illustration, the application generally depicted at 50 illustrates any application which may request the position of a GPS-MS 22 external of the wireless communication network 30. According to the present invention, other nodes of the network 30 can also request positioning of the GPS-MS 22, such as the MSC 40, or the GPS-MS 22 itself.

Figure 1:
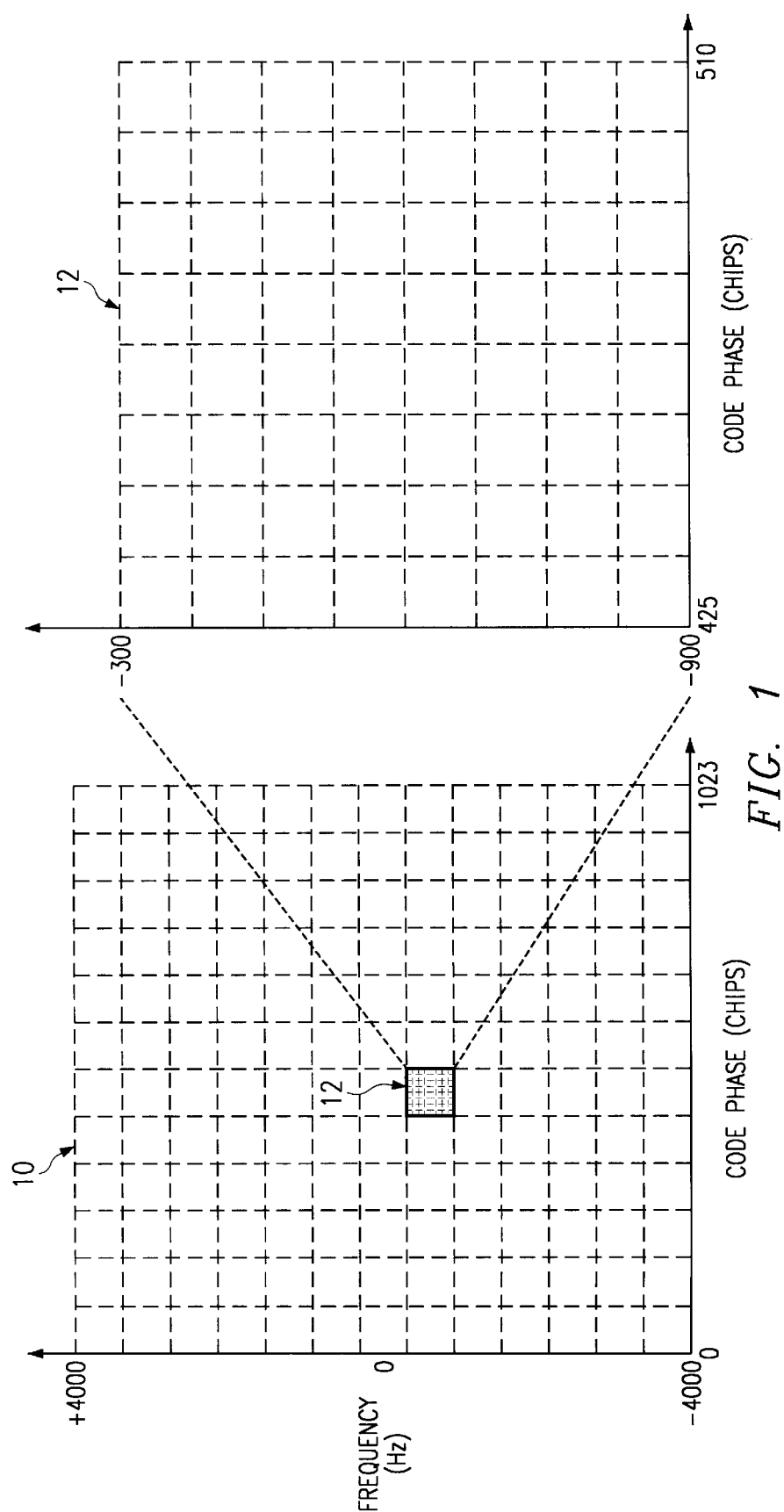
FIG. 1 is an illustration of a satellite Gold code illustrating all the possible code phases and Doppler frequencies that need to be searched for each GPS satellite, as well as a priori information comprising a subset of the Gold code.

To provide a brief overview of the methodology of the present invention, the MLC 34 first identifies the BTS 36 currently serving GPS-MS 22, obtains the geographical location of the BTS 36 serving cell 32 serving GPS-MS 22, and then obtains the air interface time and the absolute GPS time at the BTS 36 serving the GPS-MS 22. This timing is obtained through messaging across the air interface in the network 30 to the LMU 42 associated with the BTS 36 currently serving the GPS-MS 22. Through the messaging, the MLC 34 obtains the relation of the air interface time to the absolute GPS time. Based upon the geographical location of the BTS 36 serving the GPS-MS 22, the MLC 34 provides range measurement assistance data as a function of the air interface time to the GPS-MS 22. This range measurement assistance data is provided with a time stamp comprising the time of calculation for the range measurement assistance data, this time being expressed in air interface timing, that the range measurement assistance data is to be utilized by the GPS-MS 22 to calculate GPS measurement data from the GPS satellites 24. The GPS-MS 22 utilizes the range measurement assistance data at the indicated time of calculation, comprising a priori information to obtain the GPS measurement data, thereby significantly reducing the search time for the GPS measurement data based on the a priori information of the Gold code for each satellite 24, as depicted in FIG. 1.

The GPS-MS 22 determines the GPS measurement data using the provided range measurement assistance data at the indicated time of calculation, and returns the GPS measurement data through the air interface of network 30 to the MLC 34 for further computation. Finally, the MLC 34 determines the position of the GPS-MS 22 as a function of the returned GPS measurement data, after converting the interface time to the absolute GPS time, and utilizing the ephemeris data.

Referring now to FIG. 4, there is shown a message flow diagram of the methodology of the present invention which will now be described in considerable detail. Initially, the application 50 provides a Positioning Service Request message to the MLC 34 requesting the position of a particular GPS-MS 22. The application 50 may be external to the network 30, as shown in FIG. 3, but may reside within the network 30 itself such as MSC 40, and may even comprise the GPS-MS 22 itself.

Responsive to the Positioning Service Request message, the MLC 34 sends a Routing Information Message to a HLR 52 associated with the particular GPS-MS 22 to be located. Provided with this Routing Information Message is subscriber privacy check information.

The HLR 52 provides an acknowledgment ACK message back to the MLC 34 indicating which MSC/VLR 40 is currently serving the GPS-MS 22.

The MLC 34 then responsively sends a Request Subscriber Location message to the serving MSC/VLR 40, requesting that the MSC/VLR 40 provide the general location of the GPS-MS 22 by indicating the particular BTS 36 currently serving the GPS-MS 22.

If the GPS-MS 22 is idle, the MSC/VLR 40 initiates a Page message to the GPS-MS 22. The GPS-MS 22 responsively returns a Page Return Information message to the MSC/VLR 40 indicating which BTS 36 is currently serving the GPS-MS 22. If the GPS-MS 22 is not in the idle mode, the MSC/VLR 40 already has knowledge of which BTS 36 is currently serving the GPS-MS 22.

The MSC/VLR 40 returns a Subscriber Location message to the MLC 34 with information including the latitude and longitude coordinates of the BTS 36 currently serving the GPS-MS 22 to be located.

The MLC 34 then requests the air interface time from the LMU 42 associated with the BTS 36 currently serving the GPS-MS 22 to be located. The LMU 42 has knowledge of the air interface time at the associated BTS 36, and also a GPS receiver. The LMU 42 responsively returns the air interface time in relation to the absolute GPS time back to the MLC 34.

The MLC 34, knowing the geographical site location of the BTS 36 currently serving the GPS-MS 22 to be located, calculates and provides range measurement assistance data expressed in air interface time in a Positioning Request Message to the GPS-MS 22 to be located. This range measurement assistance data is provided with a time stamp i.e. time of assistance indicating the time, expressed at air interface time, that the range measurement assistance data is to be utilized by the GPS-MS 22 to obtain GPS measurement data from satellites 24. This time stamp is important since the GPS-MS 22 has no knowledge of the absolute GPS time, but rather, only has knowledge of the air interface time.

The GPS-MS 22 responsively and quickly obtains GPS measurement data at the indicated time of assistance provided in the Position Request Message utilizing the range measurement assistance data. The GPS-MS 22 efficiently and quickly obtains the GPS measurement data based on a priori data to speed up the search of the Gold code of the satellites 24, as shown in FIG. 1. Upon obtaining the GPS measurement data, the GPS-MS 22 returns the GPS measurement data to the MLC 34 over the air interface.

The MLC 34 ultimately determines and calculates the position of the GPS-MS 22 utilizing the provided GPS measurement data from the GPS-MS 22. The air interface time associated with the GPS measurement data is converted to GPS absolute time knowing the relation of the times as determined earlier from the LMU 32. The MLC 34 quickly determines the absolute position of the GPS-MS 22 utilizing the provided GPS measurement data, as a function of the absolute GPS time, and utilizing the ephemeris data.

The present invention achieves technical advantages whereby a GPS-MS 22 can be accurately and quickly positioned in a wireless communication network using range measurement assistance data, with reduced message traffic in the wireless network 30. The GPS-MS 22 need not be provided with the absolute GPS time. Rather, the GPS-MS 22 obtains GPS measurement data at a designated time provided and expressed as air interface time utilizing the range measurement assistance data. All of the calculation and positioning is done at MLC 34, which obtains the relationship of the air interface time to the absolute GPS time via the LMU 42 co-located with the BTS 36 currently serving the GPS-MS 22 to be located. The ephemeris data is stored at MLC 34 and is utilized to obtain the position of the GPS-MS 22 as a function of absolute GPS time. The positioning of the GPS-MS 22 is quick, taking only a matter of seconds rather than minutes to calculate since a priori information is provided to the GPS-MS 22 to speed up the search of the Gold code of the associated satellites 24 that are to be used to ascertain GPS measurement data. All of this GPS measurement data can be quickly obtained by the GPS-MS 22 and provided back to the MLC 34. Battery power at GPS-MS 22 is conserved using the methodology of the present invention since the GPS receiver at GPS-MS 22 is active only when utilized during positioning upon request, and is otherwise in a sleep mode.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A method of positioning a global positioning system mobile station (GPS-MS) served by a serving node in a wireless communications network and a GPS satellite network, comprising the steps of:
   a) determining a location cell that the GPS-MS resides;
   b) determining a relationship between an air interface time at the location cell and an absolute GPS time;
   c) providing range measurement assistance data that is associated with the air interface time to the GPS-MS as a function of the determined location cell;
   d) the GPS-MS obtaining GPS measurement data from the GPS satellites as a function of the received range measurement assistance data; and
   e) at a mobile location node remotely located from the serving node, calculating the position of the GPS-MS as a function of the GPS measurement data and the relationship of time determined in step b).

2. The method as specified in claim 1 wherein said serving node comprises a base transceiver station (BTS).

3. The method as specified in claim 1 wherein said mobile location node comprises a mobile location center (MLC).

4. The method as specified in claim 3 wherein the MLC is associated with a mobile switching center (MSC).

5. The method as specified in claim 3 wherein the MLC utilizes ephemeris data to calculate the GPS-MS position in said step e).

6. The method as specified in claim 1 wherein said serving node performs step b) and comprises a reference GPS receiver providing the absolute GPS time.

7. The method as specified in claim 6 wherein said serving node comprises a location measuring unit (LMU).

8. The method as specified in claim 1 further comprising the step of providing a time of computation of the range measurement assistance data to the GPS-MS in step c), wherein the GPS-MS obtains the GPS measurement data in step d) at the time of computation.

9. A method of positioning a global positioning system mobile station (GPS-MS) served by a base transceiver station (BTS) in a wireless communication network having a mobile switching center (MSC), a mobile location center (MLC) associated with the MSC, and a location mobile unit (LMU) associated with the BTS, the wireless communication network operable with a network of GPS satellites, comprising the steps of:
   a) the MLC identifying the BTS currently serving the GPS-MS and obtaining the air interface time at the serving BTS;
   b) the MLC providing range measurement assistance data to the GPS-MS as a function of the obtained air interface time at the serving BTS;
   c) the GPS-MS obtaining GPS measurement data as a function of the range measurement assistance data, the GPS-MS providing the GPS measurement data to the MLC; and
   d) the MLC calculating the GPS-MS position as a function of the received GPS measurement data and as a function of the obtained air interface time and the absolute time.

10. The method as specified in claim 9 further comprising the step of the MLC providing a time of computation of the range measurement assistance data to the GPS-MS, the GPS-MS obtaining the GPS measurement data at the provided time of computation.

11. The method as specified in claim 10 wherein the LMU associated with the serving BTS provides the air interface time at the serving BTS in step a).

12. The method as specified in claim 11 wherein the LMU utilizes a GPS receiver to obtain the absolute time in relation to the air interface time in step d).

13. The method as specified in claim 12 wherein the MLC utilizes ephemeris data to calculate the GPS-MS position in step d).

14. A wireless communications network adapted to communicate with a mobile communication station having a GPS receiver (GPS-MS), the network operable with satellites of a GPS system, comprising;
   a serving node adapted to serve the GPS-MS, said serving node having an air interface time; and
   a mobile location node remotely located from the serving node, said mobile location node having:
      means to obtain an absolute time;
      means to obtain the air interface time at the serving node;
      means to provide range measurement assistance data to the GPS-MS
   as a function of the obtained air interface time; and
      position means to calculate a position of the GPS-MS as a function of GPS measurement data provided by the GPS-MS based on the air interface time and as a function of the absolute time.

15. The wireless communications network as specified in claim 14, wherein said mobile location node further comprises means to provide time of computation to the GPS-MS instructing the GPS-MS when to obtain the GPS measurement data.

16. The wireless communications network as specified in claim 15 wherein said mobile location node comprises a MLC.

17. The wireless communications network as specified in claim 15 wherein said mobile location node further comprises a mobile location center (MLC) associated with a MSC.

18. The wireless communications network as specified in claim 15 wherein the serving node has a GPS receiver providing the absolute time in relation to the air interface time to the mobile location node.

19. The wireless communications network as specified in claim 14 wherein said position means has means to store ephemeris data, said position means calculating the position of the GPS-MS as a function of the ephemeris data.

* * * * *